Jan. 8, 1963     W. ZIFFER     3,071,826
SEALING STRIP
Filed Nov. 16, 1959

INVENTOR.
Walter Ziffer
BY
His Attorney

United States Patent Office 3,071,826
Patented Jan. 8, 1963

3,071,826
SEALING STRIP
Walter Ziffer, Dayton, Ohio, assignor to General Motors Corporation, Detroit, Mich., a corporation of Delaware
Filed Nov. 16, 1959, Ser. No. 853,189
2 Claims. (Cl. 20—69)

This invention relates to sealing strip assemblies and is particularly directed to a means for preventing leakage of water around sealing strips when the strips are mounted on automotive doors and the like.

Sealing strips have long been used around the periphery of automotive doors to engage the body when the door is closed and seal the door thereto whereby the interior of the body may be heated or cooled without the ingress of the external atmosphere and without the egress of the interior air. Furthermore, these sealing strips prevent leakage of rain, etc., around the doors and into the body and also prevent drafts and the like.

Automotive doors are hollow sheet metal structures upholstered at the internal surface thereof and these doors, due to the window which is slidably carried by the upper portion thereof, are frequently wet internally by rain which drives in and around the channels that carry the window and leaks to the interior of the door assembly. In order to eliminate this water, and prevent it from filling the internal portions of the door, drains and valving means are provided at the lower edge of the door whereby the water drains out and is eliminated.

In recent years, sealing strips have been applied to the doors through a plurality of spring clips which snap into apertures around the periphery of the door frame and such sealing strips are clearly disclosed in Patent 2,579,072, issued to Harris. The use of apertures in the door metal as a means for attaching the strips has presented a problem in that the water which drains into the interior of the door may possibly leak outwardly therefrom through the apertures which are used to engage the strip at the lower portions of the door. This permits water to seep outwardly into contact with the upholstery on the door and sometimes onto the rug which covers the floor of the automotive vehicle.

The sealing strips that are used around the doors are made from spongy elastomeric material and, in this instance, if the skin or covering on the sealing strip is ruptured adjacent the clips, it is possible for the strip to absorb moisture which is undesirable in the event that freezing weather occurs because solidification of the water within the spongy structure of the sealing strip will, in many instances, injure the strip and, in all instances, will make the sealing thereof imperfect.

In the past, therefore, it has been the practice to use a caulking or sealing compound around the apertures at the lower interior portions of the door whereby these apertures are sealed. While this procedure eliminates the water leakage difficulties, it is costly and likewise, if the strip is removed from the door for any purposes and then replaced, it is difficult to reseal the apertures with sealing compound when the upholstery is in place.

The use of wire in the strip is particularly desirable since this wire reinforces the strip and prevents it from being torn or ripped easily from the door. Thus, in the present invention, a wire reinforcement is provided in the strip and the strip is sealed to the door around the apertures therethrough. The present invention is directed, therefore, to means for sealing the apertures which is less expensive and more convenient than caulking.

Another object of this invention is to provide means for sealing the apertures which are concomitantly used as the attaching means.

A still further object of the invention is to provide resilient attaching means which are carried by the metal reinforcement within the strip whereby the strip may be sealingly attached to the door while simultaneously being reinforced by the extensible wire reinforcement therein.

In carrying out the above object, it is a further object to provide elastomeric attachment points which may be positioned and spaced on the reinforcing strip and which may likewise be introduced into the mold as a part of the strip whereby the attachment points are formed as an integral part of the strip.

Further objects and advantages of the present invention will be apparent from the following description, reference being had to the accompanying drawings wherein preferred embodiments of the present invention are clearly shown.

Figure 1:
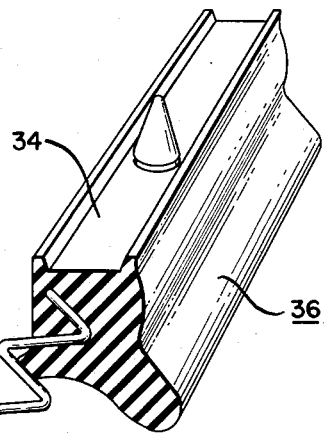
FIGURE 1 is an expanded view of a strip assembly depicting a first attachment point separate from the reinforcement, a second attachment point carried between the reinforcement and a third attachment point assembled to the strip with the reinforcement mold therein.
Figure 2:
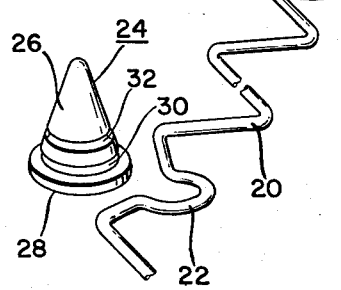
FIGURE 2 is a sectional fragmentary view of one form of sealing strip and attachment in place between two body members of an automotive body, such as the door and the door frame.
Figure 2:
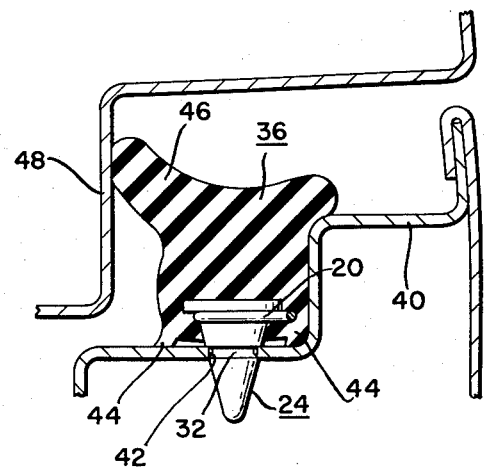
Figure 3:
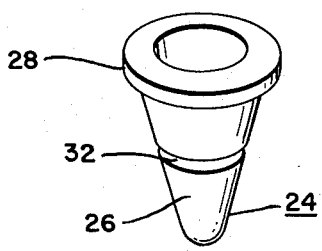
FIGURE 3 is a perspective view of one of the attachment points as used with the present invention.

Referring specifically to FIGURE 1, a zig-zag reinforcing wire 20 is provided of indeterminate length which has, at spaced points therealong, looped receptacle portions 22 open at one side. The receptacle portions 22 are dimensioned so as to receive elastomeric attachment points or caps 24 which include a conical portion 26 integral with an enlarged base 28. Therebetween are a pair of spaced grooves 30 and 32. The groove 30 is dimensioned so as to receive and snap around the looped portion 22 of the wire reinforcement 20 so that the elastomeric attachment point may be removably held to the reinforcing wire 20 as shown in FIGURE 1 at A. Subsequent to the attachment of these reinforcing points progressively to an indeterminate length of the reinforcing wire 20, the wire is positioned in a mold and latex foam or other suitable material is flowed therearound to embed the wire and the base portion 28 of the attachment point 24. This is shown at the right-hand portion of FIGURE 1. In this position, the groove 32 is still above the surface 34 of the rubber strip 36.

In the attachment of the strip 36 to a door, for example, a portion of the frame being shown at 40, the attachment point 24 is forced through an aperture 42 provided in the metal of the door and is forced downwardly therein until the groove 32 snaps into the aperture to releasably hold the strip in place. It will be noted that edge portions 44 on the strip aid in sealing the strip to the door. The strip includes a sealing flange 46 which, when the door is closed, flexes against the door jamb 48.

The present invention may take a number of forms, the one shown here being preferred, and, in all instances, the invention comprehends the use of molded-in-place attachment points wherein no wire is exposed and wherein the attachment wires are sealingly engaged to the strip to prevent any leakage therearound.

The present invention is an improvement over the device shown in copending application Serial No. 750,321, now abandoned, wherein removable plastic coverings are providing for attachment lugs on sealing strips.

The attachment points molded into the strip firmly hold the strips into sealing engagement with the door or frame member and thereby prevent completely any leakage or seepage of water which is within the door outwardly of the apertures whereby any accumulation of moisture within the door frame, for example, will drain therefrom through regularly provided drain openings without entering the interior of the body and staining the upholstery. The tapered shape of the attachment point plus the inherent resiliency of the elastomer used in its manufacture make application of the strip much easier than heretofore since the tapered nose fits into the apertures provided in the sheet metal and then by slight pressure applied on the strip, the attachment point snaps into place so that opposite edges of the groove portion 32 are on opposite sides of the sheet metal.

The strip may be made from any of the usual elastomers such as latex foam, flexible polyurethane foam, vinyl foam or any other suitable material. The attachment points or caps are molded from suitable elastomeric material such as rubber, natural or synthetic, elastomeric plastics such as polyvinyl chloride, polyethylene or, for that matter, any material which is sufficiently resilient to permit easy insertion of the attachment point in the aperture in the frame member. In this connection, it is often desirable to form the attachment points of a compatible material with that of the foam so that the attachment points will bond to the strip during the curing step. In this manner, all possible leakage into the strip is prevented since a skin will form at the mold surfaces which will be coextensive with the attachment points. In most instances, however, this is unnecessary since it is usual practice to coat the sealing strips after manufacture with a sealing compound such as a polychloroprene layer or a layer of some other sort of rubber or rubber-like cement which forms a more or less abrasion-resistant covering that seals all portions of the strip to prevent the ingress of moisture therethrough.

Therefore, the invention disclosed in the present application is basically directed to resilient attachment points extending outwardly from a sealing strip which points are carried and positioned in the strip by an extensible wire reinforcement which is embedded within the strip to limit extensible movement of the strip and prevent tearing thereof. This is important since it has been found that, where attachment points are added to a strip which does not have a limiting device therein, the strip is frequently torn due to the rather low strength of the foam material when the strip is stretched. The use of the wire in the strip, therefore, limits the extensibility of the strip while simultaneously providing a means for accurately positioning the attachment points during molding and permanently holding the points against detachment or tearing from the strip.

While the embodiments of the present invention as herein disclosed constitute preferred forms, it is to be understood that other forms might be adopted.

What is claimed is as follows:

1. A sealing strip, comprising in combination; an elongate elastomeric body member, an extensible wire reinforcing member molded therein having spaced receiving notches, a plurality of conically-shaped elastomeric attachments partially embedded in said elastomeric member and carried by said reinforcing member spaced therealong within said receiving notches and having portions thereof protruding from one face of the elastomeric member in spaced relation to one another, each of said conical attachments including spaced grooves therein, one of said grooves being exposed at the outer surface of said attachment and the other of said grooves being embedded in the body member and being embraced by portions of the extensible wire reinforcing member, each of said attachments including an enlarged base portion which is initially releasably engaged by portions of the reinforcing member and which is molded within the elongate body member.

2. A sealing strip, comprising in combination; an elongate elastomeric body member, an extensible wire reinforcing member molded therein having spaced receiving notches, a plurality of elastomeric attachments partially embedded in said elastomeric member and carried by said reinforcing member spaced therealong within said receiving notches and having portions thereof protruding from one face of the elastomeric member in spaced relation to one another, each of said attachments including spaced grooves therein, one of said grooves being exposed at the outer surface of said attachment and the other of said grooves being embedded in the body member and being embraced by portions of the extensible wire reinforcing member, each of said attachments including an enlarged base portion which is initially releasably engaged by portions of the reinforcing member and which is molded within the elongate body member.

References Cited in the file of this patent

UNITED STATES PATENTS

| | | |
|---|---|---|
| 1,705,455 | Griffiths | Mar. 12, 1929 |
| 2,102,392 | Tea | Dec. 14, 1937 |
| 2,657,438 | Spraragen | Nov. 3, 1953 |
| 2,935,770 | Gagnier | May 10, 1960 |
| 2,938,249 | Milne | May 31, 1960 |